Figure 1:
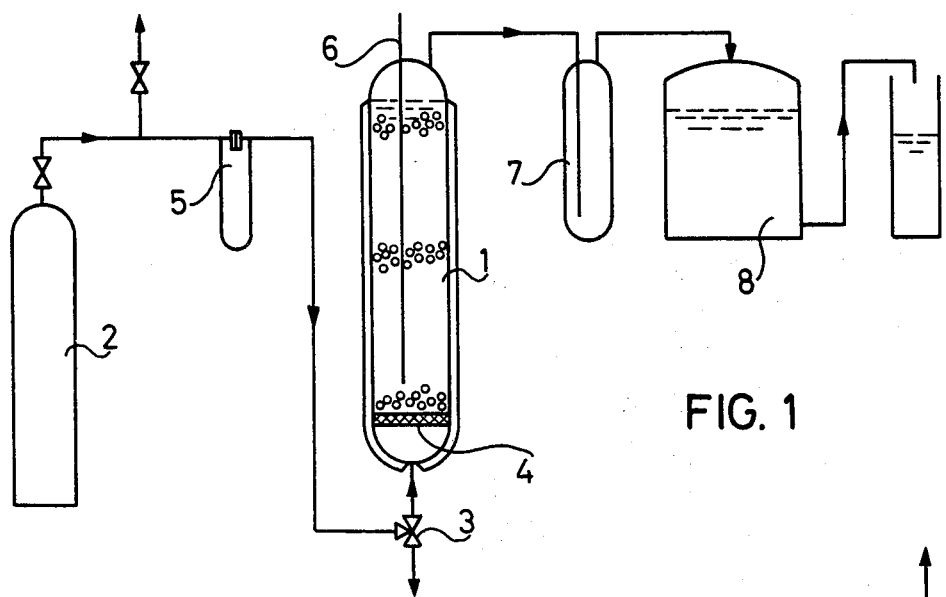

United States Patent [19]

Joerchel et al.

[11] 3,917,803

[45] Nov. 4, 1975

[54] PROCESS FOR THE PREPARATION OF PHOSPHORUS OXYBROMIDE

[75] Inventors: Egon Joerchel, Bad Soden, Taunus; Rudolf Kohlhaas, Frankfurt am Main, both of Germany

[73] Assignee: Hoechst Aktiengesellschaft, Frankfurt am Main, Germany

[22] Filed: June 19, 1973

[21] Appl. No.: 371,538

[30] Foreign Application Priority Data

June 21, 1972 Germany............................ 2230109
Feb. 19, 1973 Germany............................ 2308069

[52] U.S. Cl. ................................................. 423/300
[51] Int. Cl.² ......................................... C01B 25/10
[58] Field of Search ..................................... 423/300

[56] References Cited
UNITED STATES PATENTS 3,136,606 6/1964 Belohlav et al. .................... 423/300
3,155,456 11/1964 Henderson et al. .................. 423/410
3,729,548 4/1973 Lemke ................................. 423/659

FOREIGN PATENTS OR APPLICATIONS 719,109 11/1954 United Kingdom ................ 423/659
854,206 2/1952 Germany ............................ 423/300

*Primary Examiner*—Herbert T. Carter
*Assistant Examiner*—Gregory A. Heller
*Attorney, Agent, or Firm*—Curtis, Morris & Safford

[57] ABSTRACT

The invention relates to a process for the preparation of phosphorus oxybromide from phosphorus tribromide and oxygen in the presence of nitrogen oxides in an organic solvent. The phosphorus oxybromide is separated by crystallization or vacuum distillation.

8 Claims, 2 Drawing Figures

PROCESS FOR THE PREPARATION OF PHOSPHORUS OXYBROMIDE

The present invention relates to a process for the preparation of phosphorus oxybromide ($POBr_3$).

Although phosphorus oxybromide is known for a long time, the direct synthesis thereof, that is, the oxidation of phosphorus tribromide with oxygen, is very difficult.

Phosphorus tribromide can be contacted with oxygen at rising temperatures up to its boiling point (173°C) without resulting in a visible reaction; at boiling temperature, however, an explosion-like reaction occurs, in which substantially the stable final products phosphorus pentoxide and bromine, and also a small amount of phosphorus oxybromide are formed.

Geuther and Michaelis (Ber. dtsch. Chem. Ges. 6 (1871), 766) used $NO_2$ and $N_2O_3$ as oxidants for phosphorus tribromide, and they found as reaction product phosphorus oxybromide besides phosphorus pentoxide, C. R. Johnson and L. G. Nunn (J. Am. Chem. Soc. 63 (1941), 141) continued these studies and reacted phosphorus tribromide in a closed system with varied amounts of $NO_2$ and oxygen. They found that phosphorus tribromide is oxidized with oxygen in the presence of $NO_2$ to form phosphorus oxybromide, but they could not sometimes prevent the further explosion-like reaction of the mixture which resulted in the formation of phosphorus pentoxide and bromine. For a safe reaction, according to U.S. Pat. No. 3,136,606, the phosphorus tribromide is diluted with phosphorus oxybromide, and oxidized with an oxygen/$NO_2$ mixture.

Instead of $NO_2$, also NO and $N_2O_3$ may be used, since these continue to react with oxygen to form $NO_2$. It can be taken from the test data that the reaction was carried out at about 120°–150°C in a spray tower, in which the liquid $PBr_3$/$POBr_3$ mixture was introduced by a jet into an $O_2$/$NO_2$ gas atmosphere.

Thus, an explosion-safe process for the preparation of phosphorus oxybromide had been described; however, in view of its application in industrial practice, there are still the following difficulties:

1. Phosphorus oxybromide as diluent is not completely inert to an oxygen/$NO_2$ mixture: since at temperatures above room temperature it is progressively converted to phosphorus oxide and bromine. Moreover, phosphorus oxybromide is unstable at elevated temperatures: for example, it cannot be distilled under normal pressure without decomposition. Both effects cause the loss of part of the phosphorus oxybromide under the reaction conditions of U.S. Pat. No. 3,136,606. Apart from the loss of yield of the phosphorus oxybromide which simultaneously serves as diluent, the decomposition reaction adversely affects the quality thereof.

For an economic operation of the reaction at lower temperatures which would suppress the side reactions, the activity of the $NO_2$ catalyst is insufficient.

2. Phosphorus oxybromide solidifies below 56°C and may therefore clog the corresponding apparatus parts. Also in order to avoid such troubles, the reaction in accordance with U.S. Pat. No. 3,136,606 must be carried out at temperatures which are clearly above the melting point.

It was therefore the object of the present invention to provide a process which is free from the indicated disadvantages and which results in high yields of pure phosphorus oxybromide obtained by simple methods.

In accordance with this object, a process has now been found for the preparation of phosphorus oxybromide from phosphorus tribromide and oxygen in the presence of nitrogen oxides, which process comprises carrying out the reaction in an organic solvent at temperatures of from 0° to 120°C and separating the phosphorus oxybromide formed by crystallization or vacuum distillation. The vacuum distillation of phosphorus oxybromide is advantageously carried out at bottom temperatures of from 60° to 160°C and under a pressure of from 10 to 300 mm Hg, after having distilled off the solvent having a lower boiling point than $POBr_3$.

By nitrogen oxides, there are to be understood nitrogen dioxide, $NO_2$, and the dimer thereof, dinitrogen tetroxide, $N_2O_4$, nitrogen monoxide, NO, and dinitrogen trioxide, $N_2O_3$.

Surprisingly, the process supplies very pure phosphorus oxybromide in a practically quantitative yield and without complicated purification operations, when the oxidation is carried out at temperatures from 0° to 120°C, preferably from 20° to 90°C.

As organic solvents, there are advantageously used halogenated hydrocarbons, especially fluorinated or chlorinated hydrocarbons or the mixtures thereof, which dissolve phosphorus oxybromide and nitrogen oxides, and are miscible with phosphorus tribromide, and have boiling points below 150°C, preferably from 30° to 110°C, for example methylene chloride, chloroform, carbon tetrachloride, ethylene chloride, ethylidene chloride, tetrachloro-ethylene, 1,1,1,2-tetrachloro-ethane, 1,1,1-trichloro-ethane, 1,1,2-trichloro-ethane, trichloro-ethylene or 1,1,2-trichloro-trifluoro-ethane.

Especially when the process is carried out continuously, the organic solvent is removed as far as possible by distillation after the reaction, preferably at bottom temperatures above 50°C.

The oxidation can be carried out safely when the organic solvent is used for the dilution of the phosphorus tribromide in amounts from about 20 to 90 volume %, preferably from 25 to 80 volume %. Larger amounts cause the work-up to become uneconomic, while amounts below 20 volume % adversely affect the safety of the operations.

The pressure of the oxidation according to the present invention is from about 0.5 to 10 atmospheres. Preferably, the process is carried out at normal pressure.

The choice of the solvent has no decisive influence on the oxidizability of the phosphorus tribromide. In industrial practice, lower boiling solvents are advantageous, since these can be easier removed from the reaction product, that is, phosphorus oxybromide. Furthermore, the boiling point of the solvent limits the corresponding top reaction temperature, and this effect can be used for a simple and efficient stabilization of the temperature. When the reaction rate increases, the reaction temperature rises only to the boiling point of the solvent. With the decocting solvent, also nitrogen oxides are removed from the mixture, and the reaction speed as well as the reaction heat depending thereon decrease. For example, methylene chloride (boiling point 40.2°C) is used when the reaction temperature is from 30° to 35°C, or trichloroethylene (boiling point 87.2°C), when this reaction temperature is to be from 70° to 80°C. By this method, a complicated temperature control is avoided, and the safety of the operation is considerably improved.

A further advantage of this oxidation process resides in the fact that the reaction can be initiated already at room temperature, thus requiring no extraneous heating. Because of the high degree of solubility of the phosphorus oxybromide in the solvent, the reaction mixture remains liquid during the reaction, so that there are no production problems due to cloging of apparatus.

During the reaction, the nitrogen oxides remain absorbed in the solvent, and already very small amounts are sufficient to keep the reaction going. Amounts of from 0.01 weight % of $NO_2$, relative to the phosphorus tribromide, have proved to be sufficient, amounts of from 0.1 to 1 weight % of $NO_2$ have an especially favorable effect, while concentrations of more than 5 weight % of $NO_2$ adversely affect the purity of the phosphorus oxybromide and, therefore, are of no special advantage. Contrary to known processes operating at somewhat higher catalyst concentrations, it has proved quite surprisingly that the nitrogen oxides, by their conversion to the liquid phase, acquire increased activity already at low temperatures, which results in attaining higher yields and a higher degree of purity of the product without the necessity of applying complicated purification methods. Moreover, it is possible that also oxygen, because of its increased solubility in the solvent, reacts well.

A further advantage of the process of the invention resides in the fact that the nitrogen oxides may be added together with the solvent. This method permits an exact dosage and, therefore, an especially safe operation, whereas in the hitherto known processes it is always a problem to add very small amounts of $NO_2$ besides large amounts of oxygen in a uniform and exact manner.

In the process according to the invention, when operating batchwise for example, the calculated total amount of nitrogen oxides may be added from the start and is then effective during the complete process, whereas in the hitherto known processes, because of the missing absorptive capacity of the system, $NO_2$ must be added continuously together with the oxygen. This is a further reason for the fact that the process of the invention requires altogether smaller amounts of nitrogen oxides. Finally, the use of the solvent has the advantage of considerably reducing the annoying development of aggressive and noxious vapors, such as they occur when air is contacted with phosphorus tribromide and phosphorus oxybromide. Also corrosion problems decrease, thus facilitating the maintenance of the plant.

The process may be carried out continuously or batchwise.

The reaction mixture may be worked up according to two different methods, one of which comprising cooling of the reaction mixture. The phosphorus oxybromide than precipitates and is obtained by filtration. According to the second method, the reaction mixture is not cooled, but the $POBr_3$ is obtained by distillation.

The product obtained according to the first method is possibly not free from phosphorus pentabromide, which is formed by reaction of phosphorus tribromide with bromine present in small amounts, and which precipitates on cooling together with the phosphorus oxybromide.

In order to obtain a product completely free from phosphorus pentabromide, it is advantageous to insert a solvent distillation which splits the phosphorus pentabromide possible formed. The bromine is distilled off together with the solvent, while the phosphorus tribromide is separated from the phosphorus oxybromide by the filtration. The solvent is advantageously distilled off at bottom temperatures above 50°C; the distillation being carried out under normal, reduced or elevated pressure, depending on the solvent used. The purely white mass of crystals which has crystallized after cooling of the sump is washed with a small amount of cold solvent, and then consists of practically pure phosphorus oxybromide.

When operating continuously, phosphorus tribromide, solvent and nitrogen oxides on the one hand and oxygen on the other may be fed cocurrently or counter currently; the dosage cocurrently being preferred.

When the oxygen is not completely consumed in the reaction zone, the escaping gas may be freed from the traces of nitrogen oxides by washing; the corresponding solvent advantageously serving as washing liquid. This solvent subsequently needs only to be saturated with nitrogen oxides in order to be ready for use in the reaction.

The small amounts of bromine which are collected in the distilled solvent under the conditions of continuous operation may be reconverted to phosphorus tribromide by heating with phosphorus. By this method, no wastes are created even in long-time operation; the process thus avoids any pollution.

According to the second method of work-up phosphorus oxybromide is obtained by distillation. Accordingly the reaction mixture is not cooled after the reaction or after an optional distillation of the solvent and no crystallized phosphorus oxybromide is filtered. This method has the advantage of avoiding the measures which have to be taken in order to separate the phosphorus oxybromide by crystallization, such as special crystallization apparatus, establishment of a nitrogen blanket and the like, thus simplifying above all a continuous operation and ensuring an easier handling of the product obtained in molten form, especially at discharge.

Phosphorus oxybromide is an interesting starting material for the synthesis of brominated organic compounds, for example brominated phosphoric acid esters, which are high-quality fire proofing agents.

The following examples illustrate the invention by reference to the accompanying drawing.

EXAMPLE 1

(Batchwise Process, FIG. 1)

The reactor is a glass tube 1 having a volume of 400 ml, charged with a glass bead packing and provided with a cooling jacket. The oxygen is taken from a gas cylinder 2 and introduced at the lower end of the glass tube by means of a three-way cock 3 and a frit 4. The velocity of flow is measured with the aid of a capillary 5. Thermocouple 6 serves for measuring the reaction temperatures. The escaping gas flows through a wash bottle 7 charged with carbon tetrachloride, and is collected in a gasometer 8. 100 Milliliters (285 g) of phosphorus tribromide and a solution of 1.5 g of nitrogen dioxide in 250 ml of carbon tetrachloride are introduced into the glass tube. When oxygen is fed in, the reaction starts with simultaneous heating of the reaction mixture. The amount of oxygen fed in is adjusted in such a manner that a reaction temperature of 50°C is not exceeded. At first, 6 l/h of oxygen are absorbed; after 2 hours, the absorption rate decreases to 3.5 l/h. After 3.5 hours, practically no oxygen is absorbed any more.

Subsequently, the carbon tetrachloride is distilled from the reaction mixture at a bottom temperature of up to 110°C, and the sump is then cooled to −10°C. The precipitated crystal pulp is suction-filtered and washed with a small amount of ice-cold carbon tetrachloride. The small amounts of solvent still adhering to the crystals are then removed in vacuo at room temperature. 270 Grams of phosphorus oxybromide are obtained. About 30 g of phosphorus oxybromide are in the mother liquor. The product obtained has a melting point of 55°C and corresponds to the formula $POBr_3$ with respect to its content of P and Br.

EXAMPLES 2 TO 5

These Examples are carried out according to Example 1, using different solvents. In each case, 1.5 g of $NO_2$ in 250 ml of solvent and 100 ml of phosphorus tribromide are introduced into the glass tube. The corresponding yields are practically quantitative.

The properties of the products obtained are the same as those of the phosphorus oxybromide described in the literature.

The test data are listed in the following Table.

TABLE

| Example No. | Solvent | Reaction temperature | Maximum oxygen absorption | Test period |
| --- | --- | --- | --- | --- |
| 2 | $CH_2Cl_2$ | ca. 35° C | 2.7 l/h | 8 h |
| 3 | $CHCl_3$ | ca. 50° C | 5.2 l/h | 4.5 h |
| 4 | $CClF_2—CCl_2F$ | ca. 40° C | 2.4 l/h | 9 h |
| 5 | $CHCl=CCl_2$ | 20 to 70° C | 3.5 l/h | 8 h |

EXAMPLE 6

Figure 2:
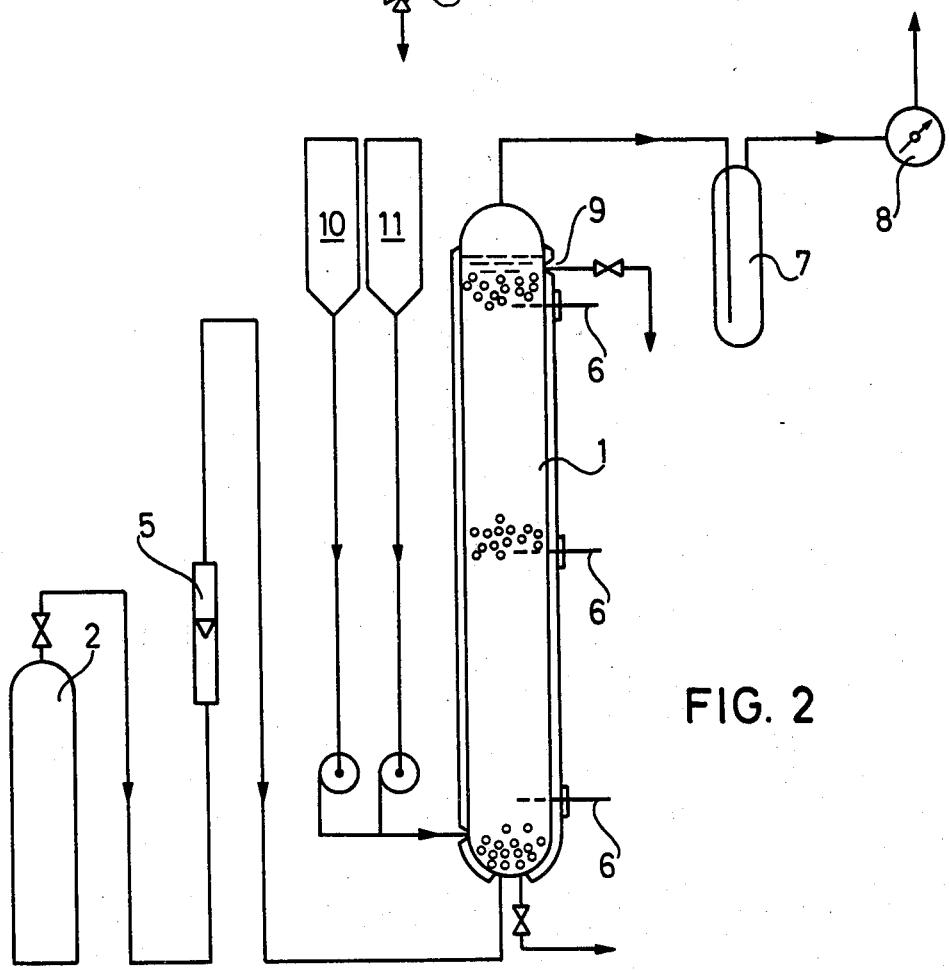

(Continuous Process, FIG. 2)

The reactor of a pilot plant consists of a glass flow tube 1 with cooling jacket, having a length of 250 cm and charged with a glass bead packing. 225 Milliliters of phosphorus tribromide 10 and 110 ml of carbon tetrachloride 11 per hour are fed in this tube. The carbon tetrachloride contains 11 g per liter of $NO_2$ in dissolved form. The oxygen is taken from a gas cylinder 2 and introduced at the lower end of the reactor tube, thereby passing a flow meter 5. Three control points 6 for measuring the temperature are distributed over the length of the reactor tube. The liquid reaction mixture is taken off at top 9 of the tube, while the non-reacted oxygen flows through a wash bottle 7 for the absorption of the nitrogen oxides carried along, and escapes via a gas meter 8.

After a starting period, about 26.5 l of oxygen are absorbed per hour. The reaction temperatures over the length of the flow tube are from 60° to 30°C. The ratio of phosphorus oxybromide to phosphorus tribromide at the top of the flow tube is 97.5 : 2.5. The product let off is collected and worked up batchwise as described in Example 1. The conversion to phosphorus oxybromide is nearly quantitative; a product is obtained which has melting point of 54°–56°C. The analysis data found for P and Br correspond to the values calculated for $POBr_3$ within the tolerances.

EXAMPLE 7

(Continuous Process, Distillation Work-up)

The crude reaction mixture is prepared as described in Example 1. When the oxygen absorption is complete, the reaction mixture, however, is separated by distillation. First, carbon tetrachloride is distilled off under normal pressure up to a bottom temperature of 110°C. Subsequently, the distillation is continued under reduced pressure. After an intermediate fraction which contains small amounts of phosphorus tribromide, the phosphorus oxybromide passes over at a reduced pressure of 15 mm Hg and a bottom temperature of from 75° to 90°C. Altogether, 290 g of phosphorus oxybromide having a melting point of 55°C are obtained.

What is claimed is:

1. A process for the preparation of phosphorus oxybromide from phosphorus tribromide and oxygen in the presence of nitrogen oxides as a catalyst, which comprises reacting phosphorus tribromide at a pressure from about 0.5 to 10 atmospheres with oxygen in a halogenated hydrocarbon solvent capable of dissolving phosphorus oxybromide and nitrogen oxides and being miscible with phosphorus tribromide and having a boiling point from 30°C to 150°C at temperatures of from 0° to 120°C said solvent being at least one halogenated hydrocarbon and during the reaction being present at least 20 percent and up to 90 percent by volume of a reaction mixture, and separating the obtained phosphorus oxybromide obtained from said reaction mixture, whereby solidification of said phosphorus oxybromide and clogging of apparatus is avoided.

2. The process as defined in claim 1, wherein nitrogen oxides are added in amounts of from about 0.01 to 5 weight percent, calculated as $NO_2$ and with reference to phosphorus tribromide.

3. The process as defined in claim 1, wherein the phosphorus oxybromide is separated by distillation under a pressure of from 10 to 300 mm Hg and at sump temperatures from 60° to 160°C.

4. The process as defined in claim 1, wherein a solvent is used having a boiling point below 150°C.

5. The process as defined in claim 1 wherein phosphorus oxybromide is separated by crystallization.

6. The process as defined in claim 1, wherein phosphorus oxybromide is separated by vacuum distillation from said reaction mixture.

7. The process as defined in claim 1, wherein after the reaction, first the halogenated hydrocarbon solvent is removed by distillation and subsequently, the phosphorus oxybromide is isolated by crystallization.

8. The process as defined in claim 1, wherein a halogenated hydrocarbon is methylene chloride, chloroform, carbon tetrachloride, ethylene chloride, ethylidene chloride, tetrachloro-ethylene, 1,1,1,2-tetrachloroethane, 1,1,1-trichloro-ethane, 1,1,2-trichloroethane, trichloro-ethylene or 1,1,2-trichloro-trifluoro-ethane.

* * * * *